United States Patent
Mendez et al.

(10) Patent No.: US 12,013,279 B2
(45) Date of Patent: Jun. 18, 2024

(54) VOLUME FILL AIRFLOW MEASUREMENT

(71) Applicant: Kane USA, Inc., Beaverton, OR (US)

(72) Inventors: Demian Mendez, Camas, WA (US); Adolfo Wurts, Camas, WA (US); Randy Hude, Camas, WA (US)

(73) Assignee: Kane USA, Inc., Beaverton, OR (US)

( * ) Notice: Subject to any disclaimer, the term of this patent is extended or adjusted under 35 U.S.C. 154(b) by 461 days.

(21) Appl. No.: 16/840,904

(22) Filed: Apr. 6, 2020

(65) Prior Publication Data
US 2021/0310845 A1    Oct. 7, 2021

(51) Int. Cl.
*G01F 3/22*   (2006.01)
*F24F 11/89*  (2018.01)
*G01S 17/08*  (2006.01)

(52) U.S. Cl.
CPC .............. *G01F 3/227* (2013.01); *F24F 11/89* (2018.01); *G01S 17/08* (2013.01)

(58) Field of Classification Search
CPC ... G01F 3/227; G01F 1/05; G01F 3/22; G01F 25/17; G01F 1/007; F24F 11/89; G01S 17/08
USPC .......................................................... 73/269
See application file for complete search history.

(56) References Cited

U.S. PATENT DOCUMENTS

| | | | | |
|---|---|---|---|---|
| 4,030,358 A | * | 6/1977 | Noll | G01P 5/14 |
| | | | | 73/861.66 |
| 4,231,253 A | * | 11/1980 | Ohnhaus | G01F 1/40 |
| | | | | 73/861.62 |
| 4,548,076 A | * | 10/1985 | Haake | G01F 7/00 |
| | | | | 73/861.66 |
| 4,619,138 A | * | 10/1986 | Ohnhaus | G01F 15/18 |
| | | | | 73/198 |
| 4,807,667 A | * | 2/1989 | Ohnhaus | G01F 1/40 |
| | | | | 73/861.62 |
| 5,234,274 A | | 8/1993 | Hyzyk et al. | |
| 6,439,061 B1 | * | 8/2002 | Nelson | G01F 1/46 |
| | | | | 73/861.65 |

(Continued)

FOREIGN PATENT DOCUMENTS

DE   102014000241 A1 * 11/2014 ............ F24F 13/06
WO       2012018480 A1    2/2012

OTHER PUBLICATIONS

Forrest Tso, Simple Methods for Measuring Airflow, Jan. 24, 2018, https://www.linkedin.com/pulse/simple-methods-measuring-air-flow-forrest-tso (Year: 2018).*

(Continued)

*Primary Examiner* — Eric Blount
(74) *Attorney, Agent, or Firm* — J. Douglas Wells

(57) ABSTRACT

A method of measuring airflow from an HVAC outlet vent using a volume fill airflow measurement device having a LIDAR or Time-of-Flight (ToF) laser-ranging sensor to detect a filled state of a volume capture element or bag, comprising placing a frame having the bag sealably attached thereto over the vent to be measured, starting a timer, stopping the timer automatically in response to the LIDAR or Time-of-Flight (ToF) laser-ranging sensor measuring the distance to be within a predetermined range, and calculating the measured airflow based on the volume of the bag and the time for the airflow to fill the bag. The measured airflow is then displayed on the device display.

15 Claims, 9 Drawing Sheets

(56) References Cited

U.S. PATENT DOCUMENTS

| | | | |
|---|---|---|---|
| 7,169,039 B2 | 1/2007 | Oppedisano et al. | |
| 8,757,008 B1* | 6/2014 | Nelson | G01F 1/44 73/861 |
| 10,001,151 B2* | 6/2018 | Moss | F15D 1/02 |
| 10,422,716 B2* | 9/2019 | Moss | G01M 3/3218 |
| 2012/0028562 A1* | 2/2012 | Heim | F24F 7/065 454/333 |
| 2019/0275239 A1 | 9/2019 | Richter et al. | |

OTHER PUBLICATIONS

Walker, I. et al., "Evaluation of Commercially Available Techniques and Development of Simplified Methods for Measuring Grille Airflows in HVAC Systems," Berkeley Lab Energy Technologies Area Website, Available Online at https://eta-publications.lbl.gov/sites/default/files/lbnl-51551.pdf, Aug. 2003, 46 pages.

"ANSI/RESNET/ICC 380-2016: Standard for Testing Airtightness of Building Enclosures, Airtightness of Heating and Cooling Air Distribution Systems, and Airflow of Mechanical Ventilation Systems," RESNET Website, Available Online at https://www.resnet.us/wp-content/uploads/archive/resblog/2016/01/ANSI-RESNET-ICC_380-2016-posted-on-website-6-15-16.pdf, Feb. 4, 2016, 27 pages.

"Air Flow Measurement Part 2—CFM, K-Factors and More," YouTube Website, Available Online at https://www.youtube.com/watch?v=dqPeom7qBlw&list=ULMJhDlyPC2T8&index=49, Aug. 9, 2017, 4 pages.

ISA Korean Intellectual Property Office, International Search Report and Written Opinion Issued in Application No. PCT/US2021/026012, Jul. 21, 2021, WIPO, 11 pages.

* cited by examiner

VOLUME FILL AIRFLOW MEASUREMENT

CROSS-REFERENCE TO RELATED APPLICATIONS

None.

BACKGROUND OF THE INVENTION

The technical field of invention relates to measurement of airflow, and, more particularly, volume fill airflow measurement of a mechanical ventilation system at an outlet terminal.

Different methods and devices may be used to measure airflow such as the airflow from an outlet vent. One comprises measuring the time required to fill a known volume, then dividing the volume by the amount of time taken to fill the volume to obtain an airflow rate. The measurement may comprise placing a bag over the register (outlet vent) and then measuring the amount of time it takes for airflow from the vent to fill the bag, using a stopwatch; and, finally, calculating the rate of airflow as time to fill the bag divided by volume of the bag.

Commercial devices using volume (or bag) fill airflow measurement techniques are presently unavailable. Existing devices are homemade, unique contraptions and provide limited accuracy and repeatability. A typical set up comprises an empty plastic bag taped to a wood frame, a cardboard sheet, and a stopwatch. The user places the bag and frame on the sheet of cardboard on a horizontal surface, such as a table or floor. With the cardboard covering the airflow opening leading through the frame and into the bag, the assembly is then moved close to or almost over the register (vent) with the cardboard positioned so as to prevent the bag from filling with air. The user then prepares the stopwatch, starting the stopwatch once the cardboard sheet is quickly pulled away and the frame dropped or placed to the surface surrounding the vent, to allow airflow from the vent to begin filling the bag. Once the bag fills completely, the stopwatch is stopped, and the frame and bag may be removed from covering the vent. Finally, the user hand calculates the airflow rate by dividing the volume of the bag by the time taken for airflow from the vent to fill the bag. With the appropriate dimensional analysis, the airflow measurement can be represented as, for example, cubic feet per minute (CFM) or liters per second (L/s).

Existing volume fill airflow measurement techniques may provide simple estimates of airflow from the outlet vent. However, numerous aspects may diminish accuracy and repeatability of measurement results from one measurement to the next. For a particular set up and user, for example, variation in the amount of airflow leakage around the frame, inconsistency as to how the cardboard is removed and when the stopwatch is started, variation in the resistance of the bag material in unfolding, and differences as to the user's observation and determination of the moment the bag is completely filled (and when the stopwatch is stopped) may result in differences and variation in airflow measurements for a particular outlet vent. The potential for inconsistency, diminished accuracy, and variation from measurement to measurement is further increased when a different user/technician uses the same set up, and/or when a different set up is used, for instance a set up using a different type and/or size of bag.

What is needed are designs for volume fill airflow measurement that address one or more disadvantage of existing designs.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENTS

Figure 1:
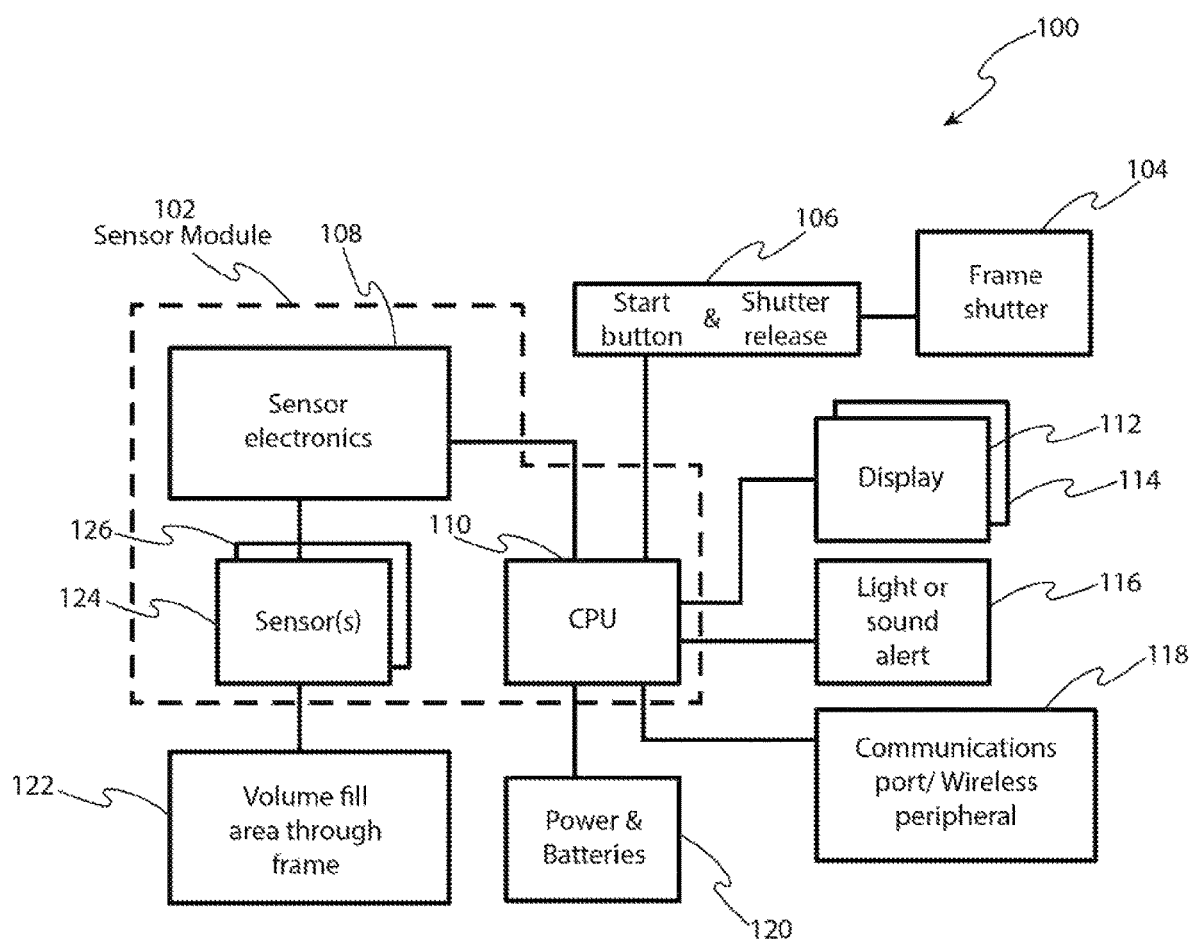
FIG. 1 is a functional block diagram of a volume fill airflow measurement device, according to various preferred embodiments.

In the following detailed description, numerous specific details are set forth in order to provide a thorough understanding of the preferred embodiments. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Preferred embodiments of a volume fill airflow measurement device comprise a frame having a volume capture element (or bag) sealably connected thereto, a frame shutter openable and closeable about the frame, and a sensor module adapted to sense a filled state of the volume capture element. The device preferably comprises a start button or shutter release for opening the shutter and starting a timer (although the device may comprises automatic means for opening and starting a timer), and a display (or multiple displays) for visually presenting a time elapsed between depression of the start button or shutter release and detection of the filled state of the volume capture element, and/or for visually presenting a calculated airflow rate, the calculated airflow rate based on a volume of the volume capture element and the time elapsed (or time required to fill the bag). The calculated airflow rate may comprise computations of a processor, and the sensor module may comprise the processor, one or more sensor adapted to detect the filled state of the volume capture element, and circuitry and/or electronics associated with the one or more sensor. Preferred embodiments may further comprise associated circuitry for providing power to the device (such as, from batteries), one or more sound (audible) and/or light (visual) alert component, and/or one or more communications port, which may include circuitry for wireless (contactless) communications with, for example, an external laptop or mobile device such as a smartphone.

Preferred embodiments of a method for volume fill airflow measurement comprise, after preparing the device, placing the frame with volume capture element over an HVAC vent to be measured, opening a frame shutter (and starting a timer) to allow airflow from the vent to fill the volume capture element (bag), detecting with a sensor module a filled state of the volume capture element (and stopping the timer), calculating a measured airflow by dividing the filled volume by the time elapsed by the timer (and optionally applying one or more correction coefficient established in a calibration of the volume fill airflow measurement device, and/or one or more correction coefficient based on a backpressure of the device and/or a resistance to deployment (unfolding and filling) of the bag (for example, due to a material thickness of the bag and/or another characteristic of the device or application of the device). Correction coefficients may take into account, for example, mass (density) and elasticity (of the bag), and/or other determinant variables. The method preferably comprises displaying at least a calculated airflow rate, and the method further preferably includes saving/recording measurement data (via memory associated with a processor of the device, or via communications with peripheral storage devices such as a laptop computer or mobile device).

Figure 2:
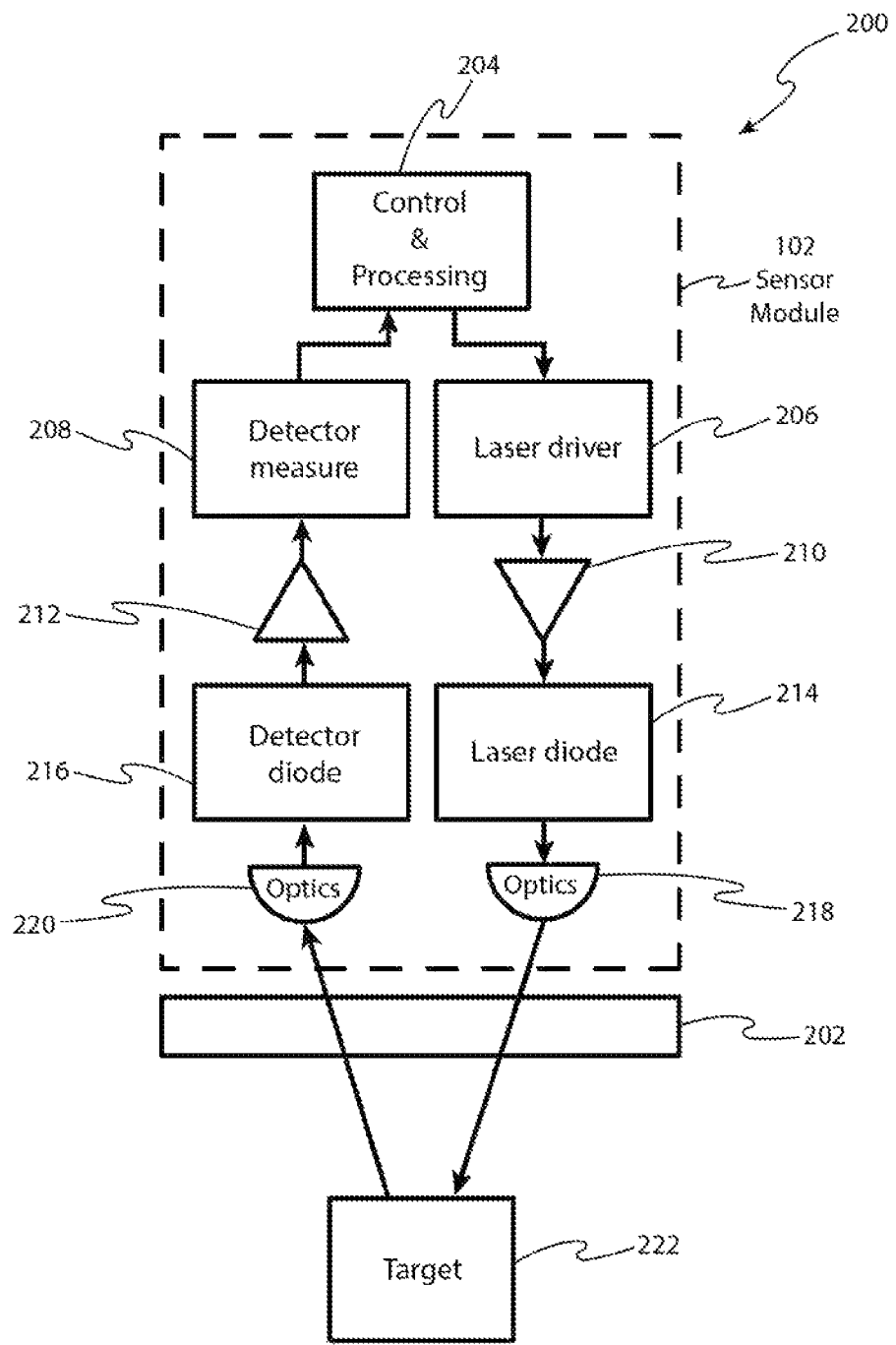
FIG. 2 is a functional block diagram an exemplary sensor module of the volume fill airflow measurement device in FIG. 1, according to various preferred embodiments.
Figure 3:
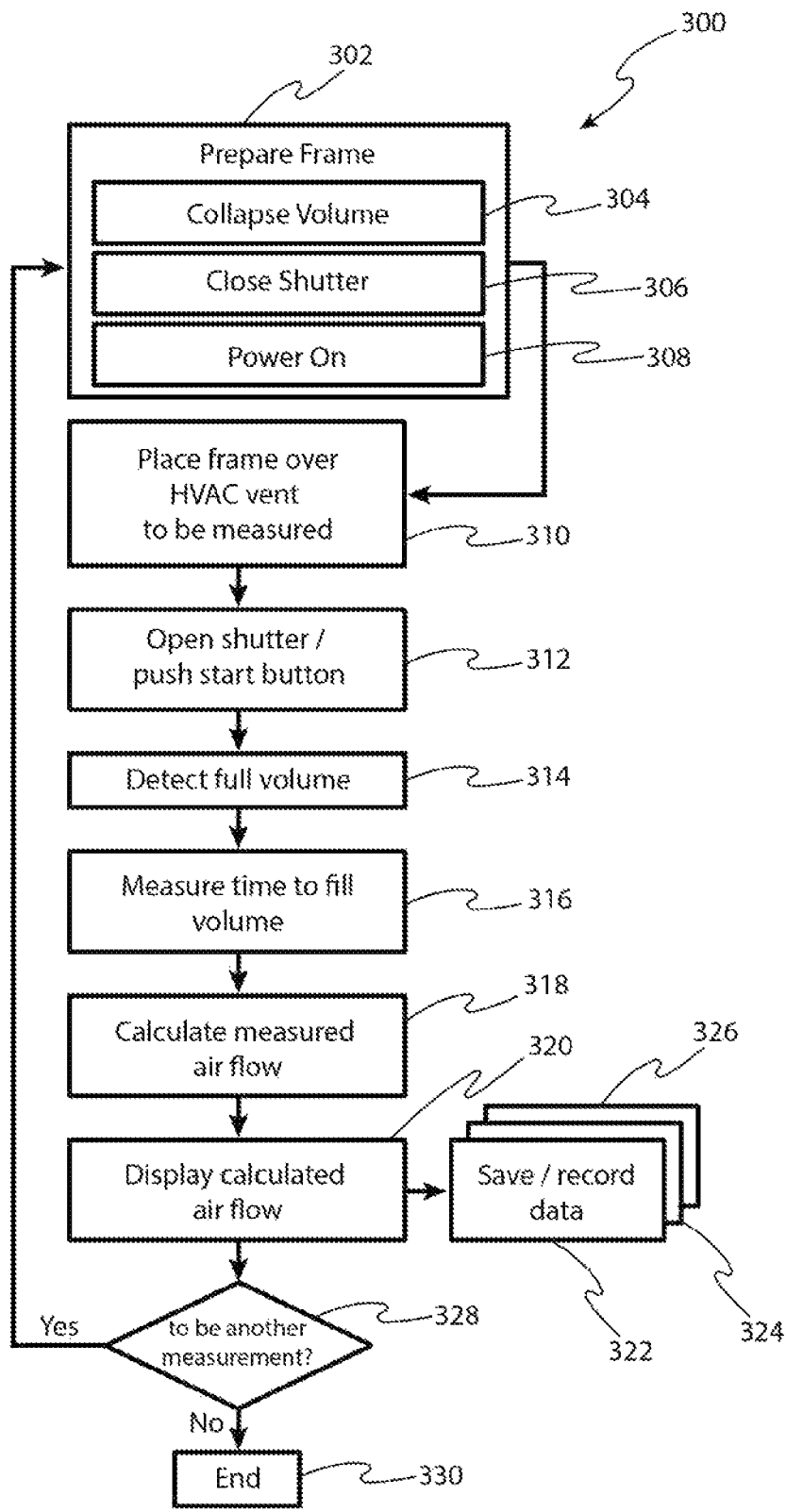
FIG. 3 is an exemplary flow chart of a method of volume fill airflow measurement, according to various preferred embodiments.
Figure 8:
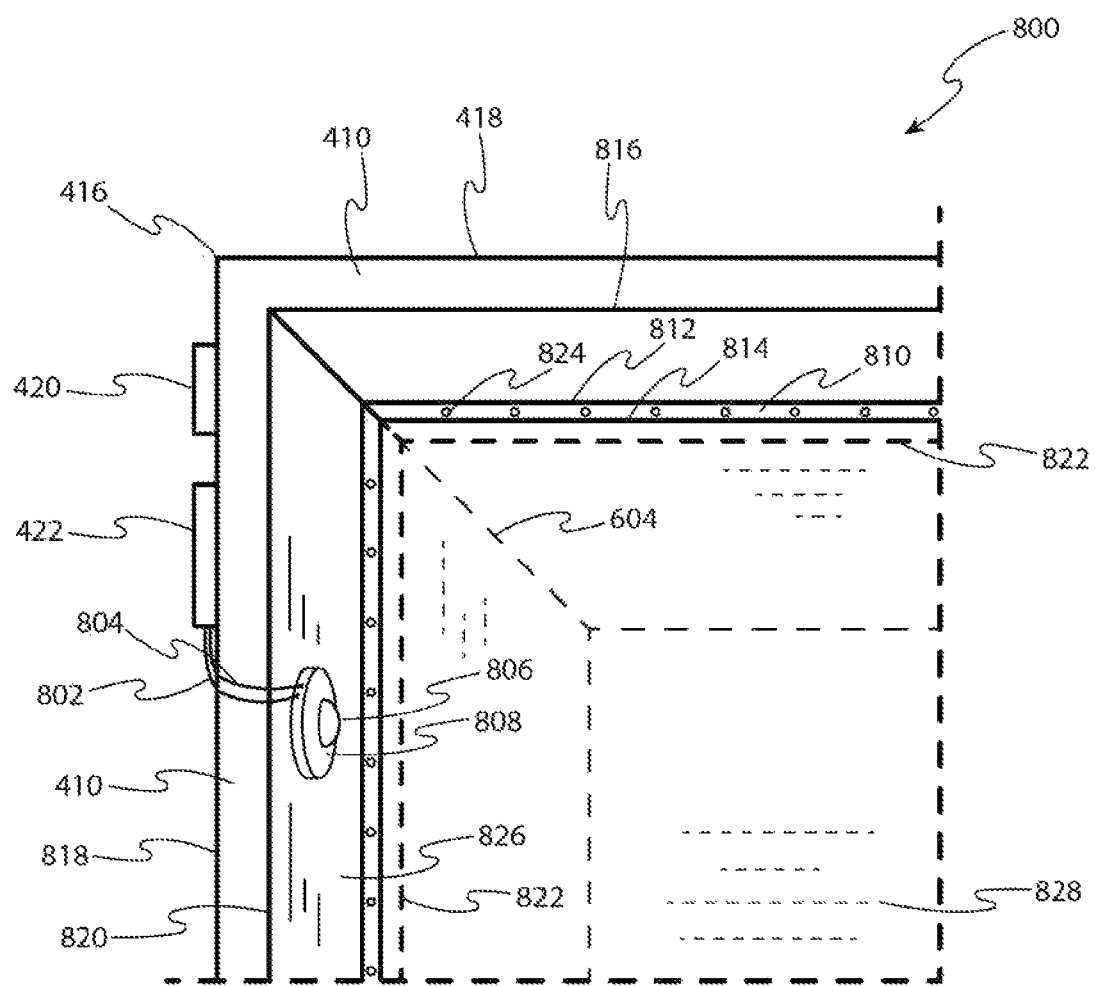
FIG. 8 illustrates an exemplary partial inside perspective view of the volume fill airflow measurement device shown in FIG. 4.
Figure 9:
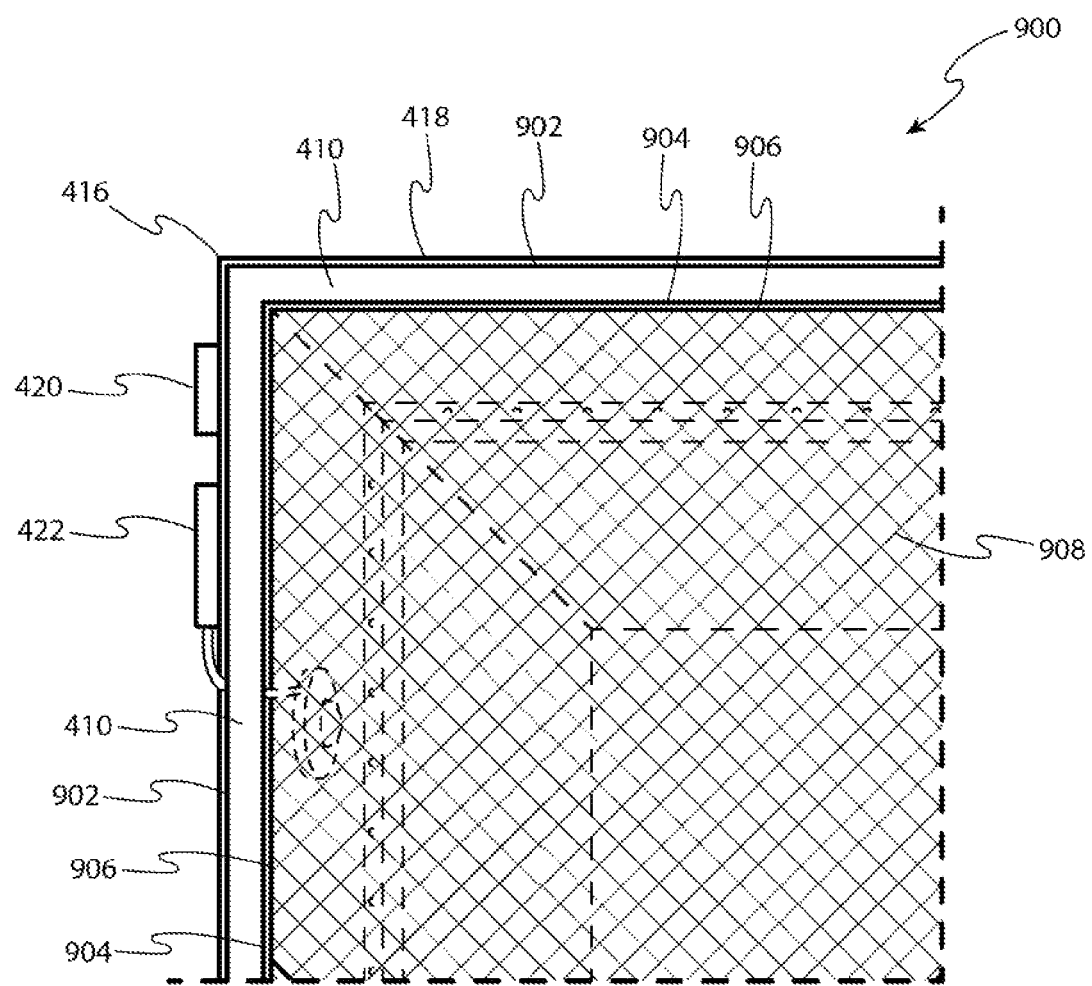
FIG. 9 illustrates an exemplary partial perspective view of the volume fill airflow measurement device shown in FIG. 8.

As an overview, FIG. 1 is a functional block diagram of an exemplary volume fill measurement device, and FIG. 2 is a functional block diagram of an exemplary sensor module comprising a LIDAR (light detection and ranging) type sensor for sensing when the volume capture element is full (in a filled state). FIG. 3 is a flow chart showing exemplary method steps for volume fill airflow measurement of a mechanical ventilation system at an outlet terminal, according to preferred embodiments. FIGS. 4, 5, 6, and 7 illustrate exemplary use of the device for measuring airflow from a vertical (wall mounted) outlet vent. And FIGS. 8 and 9 are perspective partial views showing additional details of the views shown in FIGS. 4-7 from the other (reverse) side of the device, to provide additional details involving exemplary sensor module elements and exemplary features not clearly shown or described in other views. The views shown in FIGS. 4-7, and FIGS. 8 and 9, are proportionate (to scale) for the exemplary embodiments illustrated.

FIG. 1 is a functional block diagram of a volume fill airflow measurement device 100, according to various preferred embodiments. Preferred embodiments of a volume fill airflow measurement device 100 comprise a frame having a volume capture element (or bag) sealably connected thereto (such as, referred to together as frame and volume capture element 122), a frame shutter 104 openable and closeable about the frame, and a sensor module 102 adapted to sense a filled state of the volume capture element. The frame preferably comprises structure sized and oriented so that a periphery of the frame may be set against surfaces surrounding an outlet terminal (or vent, or heating, ventilation, and air conditioning (HVAC) grille) so that airflow emitted from the outlet terminal flows through the frame opening, to fill a volume capture element (or bag) sealably attached to the frame. The frame may comprise any of a wide variety of structures and may be configured in any of a wide variety of shapes. In preferred embodiments, the frame comprises structure from which the volume capture element (such as an air fillable bag) may be deployed. And in some embodiments, the frame comprises primary structure for containing, housing, or supporting all the components that make up the volume fill airflow measurement device, such as the device 100. In one embodiment, the frame may comprise a rectangular shape having an engagement surface on one side that contacts the surfaces surrounding the vent, or surfaces (typically coplanar surfaces such as a wall, floor or ceiling) to which the vent is installed or attached. The volume capture element is preferably sealably attached to the frame so that it (the bag) unfolds or deploys in a direction opposite the vent from the frame.

The bag (or volume capture element) preferably comprises a material sized and configured so as to open from a collapsed orientation (containing no or a minimum amount of air in its collapsed state) to a filled state, with the filled state being on the opposite side of the frame engagement surfaces and outlet vent from which airflow is sourced. Preferably, the bag flexibly deploys into its filled state so that the bag has a predetermined shape within its interior when in the filled state, and the bag is easily collapsed for a subsequent volume fill airflow measurement. In some embodiments the bag comprises a flexible plastic or flexible nylon bag, and the bag is fastened to the frame so as to deflect and unfold from the frame to capture a volume of airflow. In some embodiments, the bag comprises material mass (density), thickness, flexibility, side wall dimensions, bottom dimensions, ease of (lack of resistance to) collapsing/unfolding/re-collapsing/re-folding, and other characteristics chosen to allow for inflation to a volume filled state within three to twenty seconds and so that variation between successive airflow measurements from the same target outlet vent is minimized. In some embodiments, the bag comprises any or all of the above characteristics chosen to allow for inflation to a volume filled state faster or longer than the above referenced three to twenty second. The present inventors discovered, for example, that the embodiments described herein may allow for a volume filled time that is faster (shorter) than in existing or previous bag/volume fill measurement techniques, with improved (lower) measurement-to-measurement variation. The present inventors further recognized that prior methods may have preferred volume fill durations over three seconds due to the need to manually start and stop a stopwatch, for example.

The volume capture element and frame 122 is preferably coupled to or fitted with a sensor module 102 that detects when the bag is in a filled state. The sensor module 102 preferably comprises one or more sensors 124, 126, a processor or CPU 110, and sensor electronics 108. Different types of sensors may be used. For example, as will be discussed in further detail in regard to FIG. 2, the sensor module 102 may comprise a LIDAR or Time-of-Flight (ToF) laser-ranging type of sensor, with associated supporting circuitry, with the LIDAR or ranging/range detection type of sensor adapted to detect surfaces within the bag or at least a range to an interior bag surface (such as a position on the far or backside of the bag in its filled state, or the inside of what may be referred to as a "bottom" of the bag). The sensors 124, 126 may comprise, in other embodiments, one or more pressure sensor, or a differential pressure sensor, adapted to sense pressure changes and detect pressures indicating or detecting a filled state of the bag. Other types of sensors may be used. Other types of ranging sensor types, such as, for example, ultra-sonic, or infrared, may be used.

The frame shutter 104 preferably comprises structure and material configured and oriented so as to prevent the bag from changing from its collapsed or empty state, or from filling with airflow from the outlet vent being tested/measured, until the shutter is opened. The shutter 104 preferably has a closed position (holding or causing the bag to remain in a collapsed or not-yet-filling condition) and an open position (allowing the bag to deploy and fill with airflow passing through the periphery of the frame and into the interior volume of the bag). In some embodiments, the shutter 104 comprises a sheet of material covering the frame, or at least the opening in the frame from which the bag deploys into its filled state, when in a closed position, and where the sheet retracts from covering the frame, or at least the opening in the frame from which the bag deploys into its filled state, when in an open position. In some embodiments, the shutter comprises material that may be pulled outward or unrolled from a rolled up orientation, such as in a cartridge or cylinder, and, when the shutter 104 is opened/released, the material retracts into the cartridge, preferably with a spring force causing the shutter material to remain in its rolled up state within the cartridge and to urge the shutter toward its rolled up state when the material is covering the frame when the shutter 104 is in its closed state.

The device preferably comprises a start button or shutter release 106 for opening the shutter 104 and starting a timer, and a display 112 (or multiple displays 112, 114) for visually presenting a time elapsed between depression of the start button or shutter release 106 and detection of the filled state of the volume capture element, and/or for visually presenting a calculated airflow rate, the calculated airflow rate based on a volume of the volume capture element and the time elapsed (or time required to fill the bag). The start button or shutter release 106 preferably comprises structure such as a catch or button causing release of a catch, along with circuitry to start a timer, such as a timer in CPU 110. Preferably, when the shutter is released, the timer is started as the volume capture element (bag) begins filling with air. In some embodiments, the device does not comprise a start button or shutter release 106 and instead uses automatic means for opening and starting a timer. For example, the device may comprise circuitry adapted to automatically start and/or automatically stop based on inflation of the volume capture element. The sensor module 102 may, for instance, sense inflation of the volume capture element and/or an inflation rate of the volume capture element; and the sensor module 102 may, in some embodiments, start a timer automatically based on sensed inflation.

When the sensor module 102 detects that the bag is full, the timer is stopped, the airflow rate is calculated, for example by CPU 110, and a calculated airflow and/or an elapsed time (between shutter release and bag full) is displayed, such as on display 112 or displays 112, 114. The displays 112, 114 may be any display adapted to display, for example, a calculated airflow value. The displays 112, 114 may be, for example, LCD, LED or OLED type displays.

Preferred embodiments may further comprise associated circuitry for providing power 120 to the device (such as, from batteries), one or more sound (audible) and/or light (visual) alert component 116, and/or one or more communications port 118, which may include circuitry for wireless (contactless) communications with, for example, an external laptop or mobile device such as a smartphone. The power and batteries 120 may comprise, for example, a pair of AA batteries for providing power to the sensor module 102 and/or other components of the device 100. The one or more sound or light alert 116 may comprise, for example, an audible and/or visual indication that the device 100 is powered up, shutter release closed, and sensor module ready for commencing a volume fill airflow measurement; and/or an audible and/or visual indication that the device 100 has successfully sensed, after shutter release and airflow filling the bag, that the bag reached its filled state and successfully calculated an airflow rate. Other audible and/or visual indications may be included, such as, for example, an audible or visual alert of a fault in a component of the device 100.

FIG. 2 is a functional block diagram 200 an exemplary sensor module 102 of the volume fill airflow measurement device 100 in FIG. 1, along with a frame 202 and target 222, according to various preferred embodiments. In some embodiments, the sensor module 102 may comprise a LIDAR sensor or a Time-of-Flight (ToF) laser-ranging module having an optical ranging sensor. The sensor module 102, as shown in FIG. 2, may comprise, for example, a LIDAR sensor. An exemplary LIDAR sensor may comprise, generally, control and processing circuitry 204 for controlling a laser driver 206. Control signals from the laser driver circuitry 206 may be amplified 210 (via amplification circuitry) prior to driving one or more laser diode 214. Laser diode optics 218 may be used to focus or direct a light beam or light pulse through the frame toward the target 222, which preferably comprises an interior far side or backwall of the volume capture element or bag. Light from the light beam or light pulse reflects back to be received by optics 220. The reflected light is focused or directed by optics 220 to a detector diode 216 (or photodetector). Signals from the detector diode 216 are then amplified 212 (via amplification circuitry) and transmitted to detector measurement circuitry 208, whereafter output signals from the detector measurement circuitry 208 are received by control and processing circuitry 204.

Other circuitry and/or configurations than shown in FIG. 2 may be used for a particular LIDAR sensing implementation. For example, laser diode optics 218 may comprise a rotating or phased array type laser scanning of the target 222 so that, instead of receiving range (distance) information (i.e. how far the target 222 is from the frame 202), the sensor module 102 provides detection of the scanned surfaces comprising the target 222. Scanning the far side or backwall of the volume capture element (bag) may be used for detection of a filled state of the bag.

The LIDAR sensor, in some embodiments, may be configured to measure a distance to a surface of the volume capture element or bag. Once the measured distance is within a predetermined range, where the predetermined range indicates a filled volume state of the volume capture element or bag, the sensor module 102 provides a detection that the bag is full and the timer is consequently stopped. In some embodiments, in addition to using a predetermined range, the sensor module 102 may provide a rate of change which may then be used in an algorithm for determining when the bag is full. The rate of change, the present inventors determined, may be useful for determining when the bag is stuck or near inflation. In other embodiments, and in similar fashion, the LIDAR sensor may be configured to measure (or scan for) a plurality of surface locations of the bag. Once the measured distances are within a predetermined range (of distances), the sensor module 102 provides a detection that the bag is full and the time is consequently stopped.

FIG. 3 is an exemplary flow chart of a method 300 of volume fill airflow measurement, according to various preferred embodiments. Preferred embodiments of a method, such as, for example, method 300, for volume fill airflow measurement may comprise, after preparing the device in step 302 (which may include collapsing the volume capture element in step 304, closing the shutter in step 306, and powering on the CPU and other electronics of the device in step 308): placing the frame with volume capture element over an HVAC vent to be measured in step 310; opening a frame shutter (and starting a timer) in step 312 to allow airflow from the vent to fill the volume capture element (bag); detecting with a sensor module a filled state of the volume capture element in step 314 (and, in step 316, stopping the timer to measure the time taken to fill the volume); and, in step 318, calculating a measured airflow by dividing the filled volume by the time elapsed by the timer (and optionally applying one or more correction coefficient established in a calibration of the volume fill airflow measurement device, and/or one or more correction coefficient based on a backpressure of the device and/or a resistance to deployment (unfolding and filling) of the bag (for example, due to a material thickness of the bag) and/or another characteristic of the device or application of the device). The method preferably comprises displaying, in step 320, at least a calculated airflow rate, and the method further preferably includes, in saving/recording measurement data (via memory associated with a processor of the device, or via communications with peripheral storage devices such as a laptop computer or mobile device). For example, a calculated airflow rate data may be saved/stored in step 322 in memory associated with the device, and/or saved/stored in step 324 on a laptop or mobile device, and/or saved/stored in step 326 on a separate memory device or system.

The reference numerals 322, 324, and 326 are used to reference the saving and storing of data associated with the measurement of the airflow rate via different ways (eg. on-board device memory, peripheral devices, etc.) as well as to reference recorded data in successive or separate measurements. For instance, in a first measurement sequence of steps, the calculated airflow/airflow rate (and/or other data associated with such calculated airflow, such as date and time stamp information, and/or location information, for the particular measurement) may be stored in recorded data 322. If another (second) measurement is to be taken, in decision step 328, then the volume fill airflow measurement device, such as device 100, is prepared in step 302, and the method proceeds as described above, with the resulting calculated airflow and/or other associated data (eg. unique date, time, and location of the particular airflow measurement) is stored in recorded data 324. Likewise, another subsequent (or third) measurement may comprise storing a third calculated airflow may be stored in recorded data 326. And, in preferred embodiments, subsequent measurements may be taken, for example, following the method steps as in method 300, with the measurement data stored in additional records, with the number of records limited only by the amount of available memory (whereafter additional measurements may be stored and recorded on supplemental or additional memory, or via additional peripheral memory). In some embodiments, data from successive measurements may be wirelessly communicated, such as by communications port/wireless peripheral 118, to online or cloud based memory, providing a virtually unlimited capacity for storing data from multiple measurements.

If no additional measurements are to be taken/made, in decision step 328, the method ends in step 330. In some preferred embodiments, step 330 comprises a portion of the preparation method steps 302 such as collapsing the volume capture element (in step 304) and closing the shutter (in step 306), so that the device may be powered off and stowed in a more compact and ready-to-use condition for subsequent use.

Figure 4:
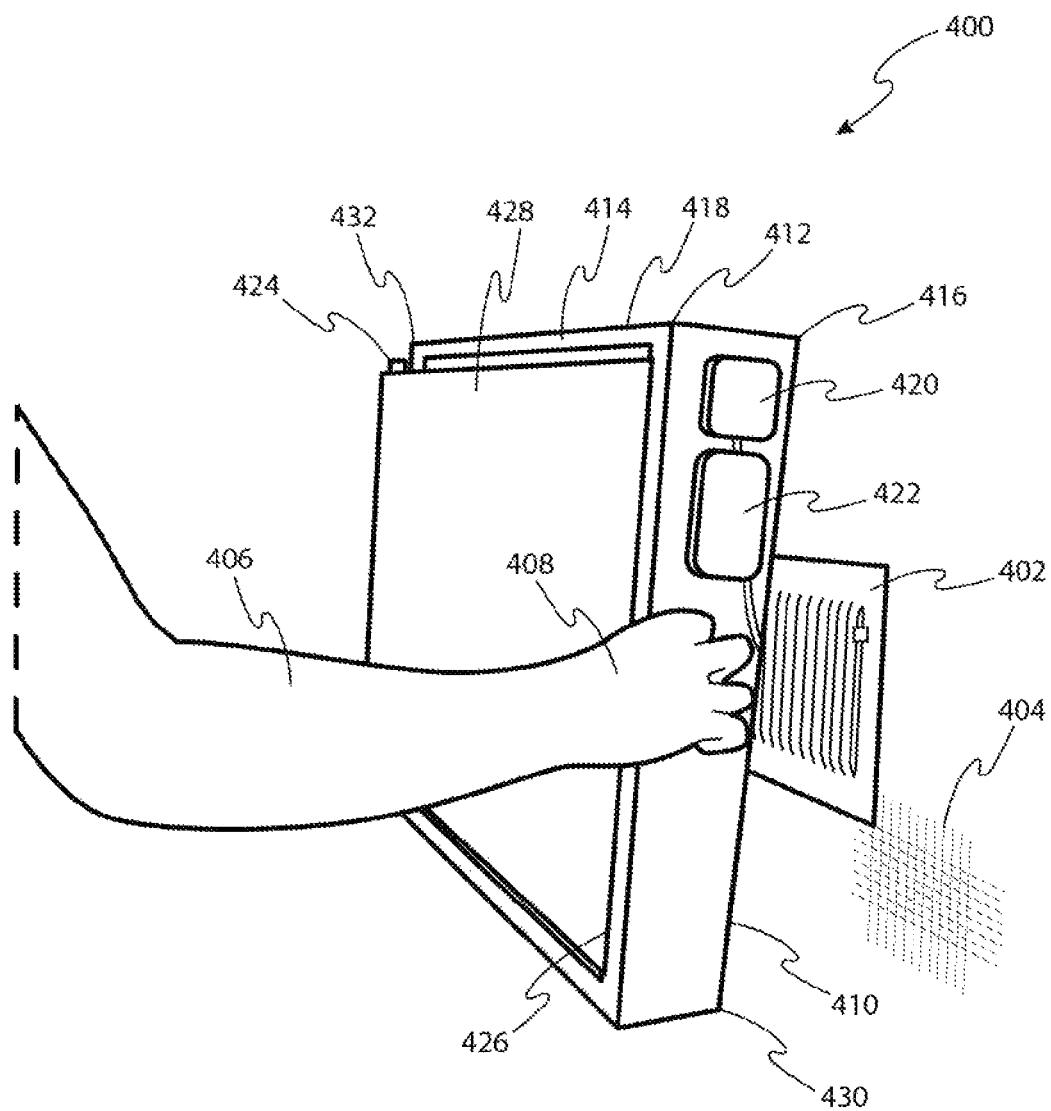
FIG. 4 illustrates placing an exemplary volume fill airflow measurement device over an outlet vent to be measured, according to various embodiments.
Figure 5:
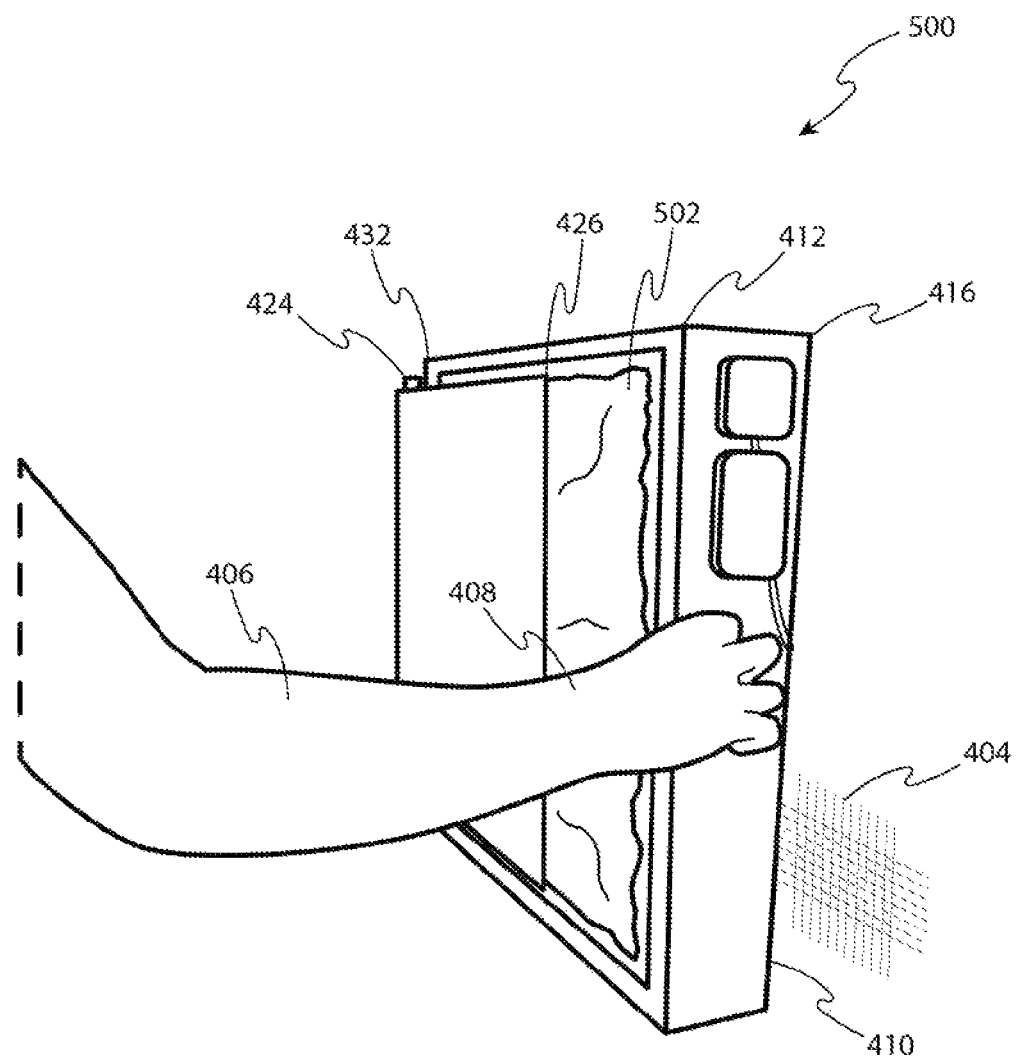
FIG. 5 illustrates opening a shutter of the volume fill airflow measurement device for airflow measurement of the outlet vent in FIG. 4.
Figure 6:
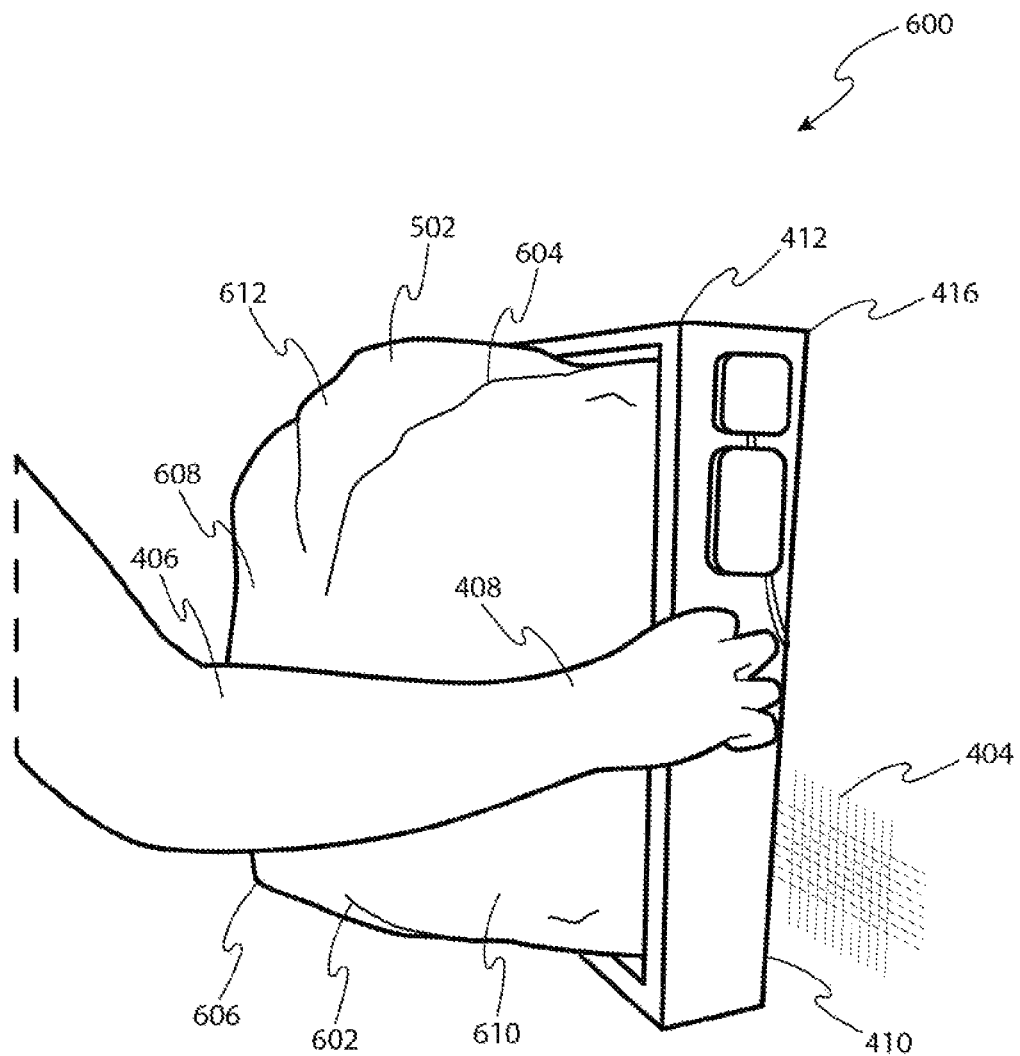
FIG. 6 illustrates a partially filled volume of the volume fill airflow measurement device in FIG. 4.
Figure 7:
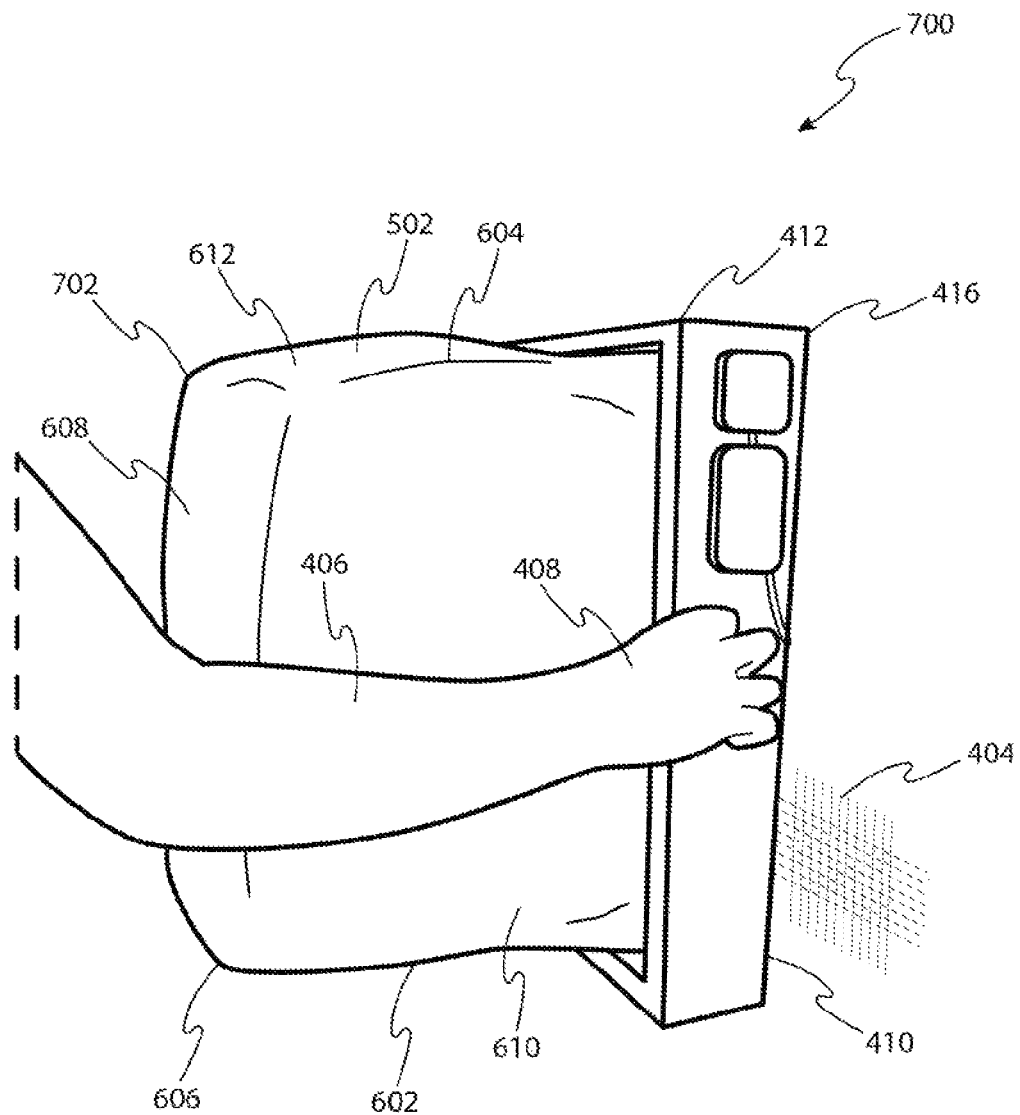
FIG. 7 illustrates a filled volume of the volume fill airflow measurement device in FIG. 4.

Turning now to FIGS. 4-7, a series of illustrations is provided to show an exemplary volume fill measurement device and use of the device for measuring airflow from a vertical (wall mounted) outlet vent, according to embodiments. Tests were performed using various embodiments in different configurations and orientations/applications. For example, FIGS. 4-7 show use of a device to measure airflow from a vertically mounted vent outlet or air vent. The tests were performed using a device substantially as shown in the illustrations, with FIG. 4 showing the frame or device held near a vertically mounted/wall mounted HVAC vent outlet. FIG. 5 shows the frame held against the wall surface and opening a shutter (and starting a timer) to permit a volume capture element to begin filling with air discharged from the wall vent. FIG. 6 shows the device about a short time later than in FIG. 5, with the volume capture element (or bag) partially filled with air discharged from the wall vent. And FIG. 7 shows the device about a short time later than in FIG. 6, with the volume capture element fully filled. In this exemplary test, the volume capture element was filled in approximately one second, the volume capture element comprised a bag oriented to capture a volume of air of approximately two cubic feet. Two cubic feet divided by one second, and multiplied by sixty seconds per minute, provides an airflow of about 120 cubic feet per minute (or 120 CFM). In another exemplary test, using a volume fill measurement device such as device 100 to measure the airflow from a horizontally mounted/floor mounted HVAC vent outlet, the volume capture element was filled (capturing a volume of approximately two cubic feet) in approximately two seconds. Two cubic feet divided by two seconds, multiplied by sixty seconds per minute, equals 60 cubic feet per minute (or 60 CFM) as the airflow rate. These exemplary calculations are based on rough visual (manual) observations associated with video capture of the testing used to create the illustrations in FIGS. 4-7, and are described here as example calculations of airflow rates based on visually reviewing video recordings of testing performed. The volume fill measurement device, such as device 100, provides volume fill airflow measurement using automation and electronic methods, for example using components comprising sensor module 102, for more accurately (and more reliably/more repeatably from measurement to subsequent measurement) determining the time taken for the volume capture element to completely fill and calculation of measured airflow rate.

FIG. 4 illustrates 400 placing an exemplary volume fill airflow measurement device over an outlet vent 402 for measurement of the airflow rate therefrom, according to various embodiments. The vent 402 shown comprises a standard HVAC air exhaust/discharge vent outlet mounted over an air duct (not shown) in a vertical wall 404. The volume fill measurement device preferably comprises a front (or engagement) face 410 for engagement with surfaces of the wall 404 surrounding the vent 402. The front face 410 (or engagement surface 410) is preferably sized and shaped with perimeter dimensions so as to enable the frame front face 410 to engage (preferably sealably engage) surfaces of the wall 404 to completely surround the vent 402, thereby directing air discharged from the vent 402 into a volume capture element contained within and surrounded by the frame structure and (in FIG. 4, hidden behind) material comprising a shutter 428. In the illustration 400, the shutter 428 is shown in a fully closed position, with the leading edge 436 of the shutter extending across the back face 414 of the frame substantially covering the inner opening of the frame through which the volume capture element may expand to fill with air discharged from the vent being tested/measured once the shutter material 428 is retracted, such as into, for example, a shutter cartridge 424 opposite the shutter leading edge 426.

In some embodiments, the measurement device may comprise, as shown in FIG. 4, batteries 420, such as for example power and batteries 120 comprising two AA batteries, for providing power to electronics 422 comprising a display, such as display 112, 114, portions of the sensor module 102 such as, for example the CPU 110, and other electronic components of the measurement device, such as device 100. Although the batteries 420 and electronics 422 are shown mounted in or one the side of the frame structure along the length extending between corners 430 and 416, the electronics 422 and batteries 420 may be positioned elsewhere, such as for example in or on top surface 418. In some embodiments, the electronic components comprising the measurement device, such as described with reference to device 100, may be integrally formed within the frame structure, mounted wholly or partially on the inside surfaces of the frame structure, or positioned other than as depicted in the figures.

Although the frame structure may comprise any shape capable of surrounding the mounting surfaces of a discharge vent (for which the discharge flow rate is to be measured), the measurement device shown includes a frame structure having a front face 410 comprising a rectangular or square shaped perimeter sized to surround a common standard sized vent outlet 402. The vent outlet 402 may be any size, and may comprise, for example, a standard sized vent such as a 4"×10", 4"×12", 6"×10", or 6"×12" register/grille. As shown, the frame has a length (or x-axis) dimension extending between corners 416 and 430, a width (or y-axis) dimension extending between corners 412 and 432, and a depth or thickness (or z-axis) dimension extending between corners 416 and 412. Exemplary outer dimensions may comprise 17 inches between corners 416 and 430, 17 inches between corners 412 and 432; and exemplary inner dimensions (shown covered by shutter 428 and through which a volume capture element (or bag) expands outward away from the front face 410 when the shutter 428 is opened and the volume capture element fills with air) may comprise 16 inches (length/x-direction) by 16 inches (width/y-direction). Exemplary depth or thickness (z-direction) dimensions (between corners 416 and 412) may comprise 3.5 to 4 inches.

As shown in FIG. 4, the frame is preferably handheld sized and light enough to be easily held using two hands, such as with a user's hand 408 extended from the user's arm 406 on one side of the frame and the other hand (not shown) on the other side of the frame. For example, a handle (hidden by user's hand 408) may be affixed on opposite sides of the frame structure.

Exemplary operation of the device shown in FIG. 4 includes powering up the electronics 422, verifying via an OLED display within the electronics 422 that the device is ready to start an airflow measurement sequence (which preferably involves electronics 422 recognizing that the shutter leading edge 426 is in a proper (closed) starting position, containing the volume capture element in an unfilled (collapsed volume) state, and enabling a shutter release and/or a timer start switch/button that starts a timer when the shutter is released), and then moving the frame into position to cover the airflow source to be measured, such as vent 402.

In some embodiments, an audible (sound) and/or visual (light) alert may be provided in, for example, the electronics 422 to provide the user with an indication that the device is ready for initiating an airflow measurement, and/or an indication of a system/device fault, and/or other indications. For example, an alert may sound if the shutter material is not fully extended into its start position for preventing airflow from the venting being tested from starting to fill the volume of the volume capture element. As further examples, an audible and/or visual alert may be used to indicate a low battery or other device condition, or to indicate, for example, a connection status of a communications port or wireless peripheral device. Other audible and/or visual indications may be provided to indicate, for example, sufficiency of engagement of the surfaces 410 with surfaces surrounding the target outlet vent to be measured, sufficiency of the volume capture element being in a collapsed volume state, a volume filling (or volume being filled) status, a volume filled state detection (or detection of a full volume capture element), successful completion of an airflow rate measurement, successful recording/storage/communication of airflow measurement data, a memory full indication, bag torn, sensor failure, etc.

Next, FIG. 5 illustrates 500 opening a shutter of the volume fill airflow measurement device for airflow measurement of the outlet vent in FIG. 4. As shown, the frame engagement surface 410 is held in (preferably sealable) contact with surfaces 404 surrounding the outlet vent being measured. Opening the shutter preferably comprises depressing a start button or shutter release button or unlatching a shutter retainer, or other mechanism allowing the shutter material to be retracted, such as retracted into shutter cartridge 424. Once the shutter is released, or simultaneous with such release, a timer is started and a volume capture element is allowed to fill with the gaseous discharge (or airflow) from the outlet vent being measured. As shown, once the shutter is released the leading edge 426 of the shutter retracts (such as into a cartridge 424) to expose the volume capture element 502, which is thereafter able to expand as it fills with airflow from the outlet vent 402. In some embodiments, the cartridge 424 comprises a spring-loaded cylinder configured to retract (and contain) the (rollable sheet) shutter material from a closed position substantially covering the rearward (toward the user in a z-axis direction, as shown in FIG. 5) opening of the frame so as to contain and hold the volume capture element in an unfilled state, to an open position exposing the rearward opening of the frame so as to allow the volume capture element to fill with gaseous discharge from the outlet vent being measured.

FIG. 6 illustrates 600 a partially filled volume of the volume fill airflow measurement device in FIG. 4. As shown, the volume capture element 502 expands as its volume fills with gaseous discharge from the outlet vent being measured, or more specifically, gaseous discharge passing through the frame opening circumscribed by the frame engagement surface 410 and into the volume of the volume capture element 502. In one embodiment, the volume capture element (or bag) comprises four sides extending rearward (in a z-axis direction) away from the frame engagement surface and a bottom opposite the frame opening/frame engagement surface, wherein the four sides and bottom, along with a surface area of the frame opening/frame engagement surface, enclose a volume when in an inflated state, and wherein material comprising sides and bottom may be folded, rolled, or otherwise deflated or compressed into a collapsed state enclosing substantially zero volume. In one embodiment, the volume capture element (or bag) 502 comprises flexible material with, as shown in FIG. 6, a rearward most surface (or bottom) 608, sides 612 and 610, an edge (or seam) 604 between sides 612 and 610, an edge (or seam) 602 between the side 610 and the side opposite side 612, and a corner 606 at a rearward most (or bottom) end of the edge 602.

In preferred embodiments, as material comprising the volume capture element 502 expands to accommodate and capture airflow from the outlet vent being measured, a sensor module, such as sensor module 102 detects whether the volume capture element has reached a filled volume state. In one embodiment, one or more sensor measures a distance from the sensor to one or more locations of the interior surfaces of the volume capture element. For example, one or more sensor may measure distances to one or more locations on the rearward most (interior) surface (or bottom) 608 of the volume capture element. If the measured distances are less than the expected or predetermined measured distances that indicate a fully filled volume capture element, the volume capture element is not yet filled and distance measurements continue to be taken. As an example, a sensor may measure the distance to a point on the bottom surface 608, and, in FIG. 6, the measured distance is insufficient to indicate a filled volume capture element and stop the timer. As shown in FIG. 6, the bottom 608 is not yet fully extended to its rearward most filled position, not all corners such as corner 606 have reached positions indicating a filled volume, and sides 612 and 610 are not yet fully expanded into positions (and thus distances) indicating a fully filled volume.

In preferred embodiments, a LIDAR sensor is used to detect when the volume capture element has reached a filled volume state, and when the filled volume state is detected the timer is stopped. The LIDAR sensor may, for example, repetitively measure the range/distance from the sensor location on an interior frame structure surface to a point directed to the bottom 608 of the bag 502. If, as in FIG. 6, the bottom 608 has not reached a filled volume distance, the sensor continues taking range measurements. In another example, the LIDAR sensor may be directed to a plurality of (target) locations and may repetitively measure distances to those target locations for indication of a filled volume. For example, the LIDAR sensor may detect a filled volume when a plurality of target locations reach predetermined range/distance measurements. The LIDAR sensor may be configured so as to detect the distances to, for example, corners of the bottom 608, indicating the volume capture element is not yet in its filled state.

Finally, FIG. 7 illustrates 700 a filled volume of the volume fill airflow measurement device in FIG. 4. As shown, the bottom 608 and sides 612 and 610 of the volume capture element are fully expanded so that the bottom 608 and corners 606 and 701 have reached locations (and distances from the frame engagement surface 410) visually indicating the volume capture element is in a filled state. In preferred embodiments, when a sensor module detects that the volume capture element has reached a filled state a timer is stopped and the elapsed time is used by the CPU of the measurement device to calculate (and display) an airflow rate based on the volume of the volume capture element and elapsed time taken between the time the shutter was released (and timer started) and the time the sensor module detected a volume filled state.

In preferred embodiments, once a frame shutter is released and a timer is started, a LIDAR sensor may, for example, continuously or repetitively/periodically at a predetermined frequency, measure the range/distance from the sensor location to a location on the bottom surface 608 of the volume capture element (bag) 502. In some embodiments, the LIDAR sensor may be used for detecting a rate of change of the distance, which may then be used in an algorithm for determination as to inflation of the volume capture element. If, as in FIG. 7, the bottom 608 has reached a filled volume distance (from the frame-mounted sensor), the timer is stopped and the airflow rate is calculated and displayed, and the data stored. In another example, a LIDAR sensor may be directed to a plurality of (target) locations and may repetitively measure distances to those target locations for indication of a filled volume (and stopping a timer). For example, the LIDAR sensor may be directed to detect the distances to the bottom 608 and bottom corners 606 and 702. If the volume capture element (bag) has reached its filled state, as shown in FIG. 7, the distances between the LIDAR sensor and each of the bottom 608 and bottom corners 606 and 702 will be equal to or greater than the predetermined filled state values for each of those locations on the interior surfaces of the volume capture element, whereupon the timer is stopped and the airflow rate is calculated and displayed, and the data stored. As previously mentioned, in some embodiments a LIDAR sensor may scan at least portions of the interior surfaces of the volume capture element for detection of a volume filled state. The LIDAR sensor may be configured, for example, to scan for detection of the bottom surface 608 at a predetermined range, the predetermined range indicating the bottom surface 608 is in a position such that the volume capture element (bag) 502 is in a volume filled state. Once a volume filled state is detected, the timer is stopped and the microprocessor/CPU/MCU (as may be included in electronics 422) calculates the airflow rate for the outlet vent 402 being tested, and the airflow rate may then be displayed, for example on an OLED or other type of display.

Also as previously mentioned, in some embodiments, other types of sensors may be used for detection of a volume filled state. As one example, a pressure sensor may be used as part of the sensor module for detecting when the volume capture element reaches a volume filled condition/state. The pressure sensor may, for example, detect an increase in pressure once the bag material 502 fully unfolds and can no longer accommodate airflow from the outlet vent being tested. In yet another example, a sensor module may comprise a flow sensitive valve switch that detects when the volume capture element reaches a volume filled state by remaining closed as the volume capture element fills until sufficient pressure causes the valve to open, permitting discharge of airflow from inside the frame and volume capture element assembly.

FIG. 8 illustrates an exemplary partial inside perspective view 800 of the volume fill airflow measurement device shown in FIG. 4. In some embodiments, the volume capture element may be fastenably secured to an inside surface 826 of the frame structure using fastening member 810 and a plurality of fasteners 824 so that the volume capture element material (having edge or seam 604 and an inside bottom surface 828) extends beyond the frame structure rearward edge 822 in a z-axis direction, away from the frame opening circumscribed by the front face 410. As shown in FIG. 8, the fastening member has a (z-axis) width between an edge 812 that is closer to the front face 410 and an edge 814 that is rearward, farther from the front face 410, and the (bag)

fastening member 810 is preferably positioned closer to an outward (rearmost) inner edge 822 of the frame than the front face 410 of the frame structure so that sensor optics 806 may be positioned between the front face 410 and volume capture element fastening member 810. In such orientation, sensor optics 806 are preferably positioned so as to have sufficient line-of-sight to the inside surfaces of the volume capture element, such as the inside bottom surface 828, edge 604, etc.

For reference with respect to FIGS. 4-7, FIG. 8 shows a partial view of a corner of an exemplary frame structure. The frame structure extending vertically is shown with an inside surface 826 (upon which sensor optics 806 is shown positioned) that has a z-axis/z-direction dimension between an inward front face inner edge 820 and the outward rearmost inner edge 822, and a front engagement face 410 that has a y-axis/y-direction dimension between front face inner edge 820 and front face outer edge 818. The frame structure extending horizontally is shown with an inside surface having a z-axis/z-direction dimension between an inward front face inner edge 816 and the outward rearmost inner edge 822, and a front engagement face 410 that has an x-axis/x-dimension between front face inner edge 816 and the front face outer edge/top surface 418. Although the front face 410 dimensions 418-816 (extending horizontally) and 818-820 (extending vertically) are illustrated to be the same (and may comprise a dimension of approximately 1.5 inches), the horizontal and vertical front face dimensions may be different. Likewise, the z-direction dimensions 816-822 (extending horizontally) and 820-822 (extending vertically) are illustrated to be substantially the same (and may comprise a dimension of approximately 3.5 inches), the z-axis dimensions for the frame structure extending horizontal and vertical may be different.

In some embodiments, a sensor module, such as sensor module 102, may comprise sensor electronics 108 and one or more sensors 124, 126 within a sensor housing 808 mounted on the frame inside surface 826, as shown. Wires 804, 802 (or wiring cable 802, 804) may electrically connect electronics 422 and the housing 808, and the wiring may be fed through a hole (not shown) extending through the 818-820 frame structure. In preferred embodiments, the sensor module comprises electronics 422, wiring 802, 804, housing 808, and optics (or optics outer protective shell) 806. In preferred embodiments, the electronics 422 may comprise a CPU (such as CPU 110) and the sensor housing 808 may comprise sensor electronics (such as sensor electronics 108) and one or more sensors (such as sensors 124, 126), with the one or more sensors comprising a LIDAR sensor as described in FIG. 2 and having optics (such as optics 218, 220) configured to optically detect one or more inside surfaces of the volume capture element (having, for example, an inside bottom surface 828) via line-of-sight through optics outer protective shell 806.

In other embodiments, the sensor module may comprise electronics 122 and a pressure sensor within a housing 808 and a mesh cover 806 through which pressure changes within the volume capture element and frame structure may be sensed and transmitted via wiring 802, 804 to electronics 422. In still other embodiments, the sensor module may comprise electronics 122 and a pressure sensitive valve switch within the housing 808 and a mesh cover 806 through which airflow from the target outlet being measured may pass through when pressure within the volume capture element and frame exceed a predetermined valve opening value.

FIG. 9 illustrates an exemplary partial perspective view 900 of the volume fill airflow measurement device shown in FIG. 8, with the front engagement face 410 comprising a sealing gasket and a screen 908 extending across the area circumscribed by the engagement face 410. The gasket is shown having a width dimension (in both x- and y-directions) between 902 and 904 (with a corresponding frame structure width dimension (in both x- and y-directions) between 418 and 906. Although optional, the present inventors discovered and determined, through testing and development of the embodiments described, a sealing gasket as described improves sealing between the frame structure and surfaces surrounding the target outlet vent to be measured, thereby reducing leakage of airflow and improving efficiency and accuracy (and measurement-to-measurement repeatability) of the airflow rate measurement. The gasket may, for example, comprise ⅛ inch to ¼ inch thick (as measured in a z-direction) compressible weather-stripping material such as weather stripping material used with residential or commercial doors.

In preferred embodiments, the screen 908 shown in FIG. 9 preferably extends over the frame opening (circumscribed by the front face 410) and may be inset slightly rearward (in the z-direction) from front face 410. The screen 908 preferably comprises openings sized so as to permit airflow from the target vent (such as vent 402) to flow through the frame structure and fill the volume capture element (bag). The present inventors discovered that the (mesh) screen openings may be any of a wide range of sizes. Screening used for typical residential or commercial window openings was found to work well. Screening with larger mesh opening, such as having for example ⅛ to ¼ inch by ⅛ to ¼ inch openings may be used. Larger or smaller screen mesh openings may be used. Correction coefficients may be used in calculating the measured airflow rate (as in method step 318), with the correction coefficients based upon empirical airflow resistance for different screen material having different opening sizes.

In preferred embodiments, the screen 908 is positioned substantially as shown in FIG. 9, near (in the z-direction) the front engagement surface 410, and allows the volume capture element (bag) to be stowed in a collapsed volume unfilled state between the screen 908 and the shutter material 428 when the shutter is in a closed, unretracted position. After the volume capture element is filled, such as during an airflow measurement as shown in FIG. 7, the user may, for example, place the frame and volume capture element with the engagement face 410 on a horizontal surface. The user may then collapse the volume capture element and fold, roll, or simply push the bag material toward the screen 908 before closing the shutter material 428 to contain the volume capture element between the shutter material and the screen 908.

The present inventors discovered and determined the described embodiments for a volume fill measurement device and methods therefor, provide improvements in the technology for measuring airflow from an outlet vent. In particular, the embodiments described provide a volume fill (or bag inflation) device having a known fill volume that is easily collapsed into an unfilled state and stowed/contained within a lightweight and simple frame structure that is easily held by a user and placed over an outlet vent to be tested. The device uses a retractable shutter that opens in a predictable and reliable manner to reduce variability from one measurement to the next. The volume capture element (bag) dimensions (sides and bottom dimensions, and material thickness) and material characteristics are selected so as to permit full inflation within a reasonable amount of time (typically under a minute and measured in seconds) and so as to minimize variation between successive (repeated) airflow measurements of the same target outlet vent. The frame structure is preferably sized to sealably surround over standard sized and oriented HVAC outlet vents. Electronics and electronic sensing is used, such as for example a LIDAR sensor, to improve repeatability, accuracy, and consistency in detecting when the volume capture element reaches a filled state and determining the time elapsed between a shutter opening and the volume filled state. Embodiments described further permit automated airflow calculation, visual display of airflow rate measurements, and electronically saving, recording, and communicating measurement related data. These and additional advantages and improvements are provided by the aforementioned embodiments and descriptions herein.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A volume fill airflow measurement device comprising:
   a frame having a volume capture element sealably connected thereto, wherein the volume capture element has a filled state and an unfilled collapsed state, includes an opening attached to the frame and sides extending to a bottom opposite the opening, and expands from the unfilled collapsed state to the filled state as a volume of air is received through the opening, the volume of air being defined by the dimensions of the sides and bottom of the volume capture element when in the filled state, and the volume of air being contained within an interior space defined by the sides and bottom of the volume capture element when in the filled state;
   a frame shutter openable and closeable about the frame, the frame shutter attached to the frame and the opening of the volume capture element so as to permit the volume of air to be received into the interior space of the volume capture element when the frame shutter is in an open state and prevent the volume of air from being received into the interior space of the volume capture element when the frame shutter is in a closed state;
   a sensor module adapted to sense the filled state of the volume capture element, wherein the sensor module comprises a LIDAR or Time-of-Flight (ToF) laser-ranging sensor adapted to detect the filled state of the volume capture element, wherein the LIDAR or Time-of-Flight (ToF) laser-ranging sensor comprises optics positioned within the frame and adapted to detect distance to an interior surface of the volume capture element; and
   a timer configured to stop automatically in response to the LIDAR or Time-of-Flight (ToF) laser-ranging sensor measuring a distance to an interior surface of the volume capture element to be within a predetermined range, the predetermined range corresponding to the volume capture element being in the filled state.

2. The device of claim 1, further comprising a start button or shutter release adapted to open the shutter and start the timer.

3. The device of claim 2, further comprising a display adapted for visually presenting a time elapsed between depression of the start button or shutter release and detection of the filled state of the volume capture element.

4. The device of claim 2, further comprising a display adapted for visually presenting a calculated airflow rate, the calculated airflow rate based on a volume of the interior space of the volume capture element when in the filled state and a time elapsed to fill the interior space of the volume capture element.

5. The device of claim 4, wherein the calculated airflow rate may comprise computations of a processor.

6. The device of claim 1, wherein the sensor module may comprise a processor, one or more sensor adapted to detect the filled state of the volume capture element, and circuitry and/or electronics associated with the one or more sensor.

7. The device of claim 1, further comprising circuitry for providing power to the device, and/or one or more audible and/or visual alert, and/or one or more communications port, the one or more communication port including circuitry for wired and/or wireless communications with an external laptop or mobile device.

8. The device of claim 2, wherein the shutter comprises a retractable sheet adapted to be closeable by a user to cover an area circumscribed by the frame, thereby containing the volume capture element in the unfilled state.

9. The device of claim 8, wherein the shutter retracts to the open position permitting airflow from an HVAC outlet vent to pass through the frame and fill the volume capture element.

10. The device of claim 1, wherein the frame comprises an engagement surface circumscribing an opening through the frame leading into the interior space of the volume capture element, the volume capture element comprising flexible material so as to permit collapsing the volume capture element to the unfilled state and expanding the volume capture element from the unfilled state in the filled state as airflow from an outlet vent passes through the opening of the frame and into the interior space of the volume capture element.

11. The device of claim 10, wherein material comprising the volume capture element is collapsible into the frame so that the material is contained between a screen proximate the frame opening and the frame shutter.

12. A method for volume fill airflow measurement comprising:
   providing a volume fill airflow measurement device comprising: a frame having a volume capture element sealably connected thereto, wherein the volume capture element has a filled state and an unfilled collapsed state, includes an opening attached to the frame and sides extending to a bottom opposite the opening, and expands from the unfilled collapsed state to the filled state as a volume of air is received through the opening, the volume of air being defined by the dimensions of the sides and bottom of the volume capture element when in the filled state, and the volume of air being contained within an interior space defined by the sides and bottom of the volume capture element when in the filled state; a frame shutter openable and closeable about the frame, the frame shutter attached to the frame and the opening of the volume capture element so as to permit the volume of air to be received into the interior space of the volume capture element when the frame shutter is in an open state and prevent the volume of air from being received into the interior space of the volume capture element when the frame shutter is in a closed state; and a sensor module adapted to sense the filled state of the volume capture element;

preparing the frame, wherein preparing the frame includes powering on electronics and circuitry associated with the sensor module, verifying the volume capture element is in an unfilled collapsed state, and verifying the frame shutter is closed about the frame so as to contain the volume capture element in the unfilled collapsed state;

placing the frame with volume capture element over an HVAC vent to be measured;

opening the frame shutter and starting a timer to allow airflow from the vent to fill the volume capture element;

detecting with the sensor module the filled state of the volume capture element and stopping the timer;

calculating, by a processor of the volume fill airflow measurement device, a measured airflow by dividing a volume of the volume capture element in its filled state by the time elapsed between starting and stopping the timer; and displaying the measured airflow on a display of the volume fill airflow measurement device, wherein the sensor module comprises a LIDAR or Time-of-Flight (ToF) laser-ranging sensor adapted to detect the filled state of the volume capture element, wherein the LIDAR or Time-of-Flight (ToF) laser-ranging sensor comprises optics positioned within the frame and adapted to detect distance to an interior surface of the volume capture element, and wherein stopping the timer comprises stopping the timer automatically in response to the LIDAR or Time-of-Flight (ToF) laser-ranging sensor measuring a distance to an interior surface of the volume capture element to be within a predetermined range, the predetermined range corresponding to the volume capture element being in a filled state.

13. The method of claim 12, further comprising saving/recording measurement data via memory associated with the processor of the device or via communications with a peripheral storage device and/or a laptop computer and/or a mobile device.

14. The method of claim 12, wherein the frame comprises an engagement surface circumscribing an opening through the frame leading into the volume capture element, the volume capture element comprising flexible material so as to permit collapsing the volume capture element to unfilled state and expanding from the unfilled state into the filled state as airflow from an outlet vent passes through the opening of the frame and into the volume capture element.

15. The method of claim 14, wherein material comprising the volume capture element is collapsible into the frame so that the material is contained between a screen proximate the frame opening and the frame shutter.

* * * * *